United States Patent
Jeon et al.

(10) Patent No.: US 7,397,524 B2
(45) Date of Patent: Jul. 8, 2008

(54) VERTICALLY ALIGNED LIQUID CRYSTAL DISPLAY HAVING POSITIVE COMPENSATION FILM

(75) Inventors: Byoung-kun Jeon, Daejeon (KR); Sergey Belyaev, Daejeon (KR); Jeong-su Yu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 383 days.

(21) Appl. No.: 10/543,623

(22) PCT Filed: Jan. 27, 2004

(86) PCT No.: PCT/KR2004/000131

§ 371 (c)(1),
(2), (4) Date: Dec. 23, 2005

(87) PCT Pub. No.: WO2004/068223

PCT Pub. Date: Aug. 12, 2004

(65) Prior Publication Data

US 2006/0176426 A1    Aug. 10, 2006

(30) Foreign Application Priority Data

Jan. 28, 2003    (KR) .................. 10-2003-0005466

(51) Int. Cl.
*G02F 1/1335*    (2006.01)
*G02F 1/1337*    (2006.01)

(52) U.S. Cl. .................. 349/119; 349/117; 349/118; 349/130

(58) Field of Classification Search .................. 349/118, 349/119
See application file for complete search history.

(56) References Cited

U.S. PATENT DOCUMENTS 4,889,412 A    12/1989    Clerc et al.

(Continued)

FOREIGN PATENT DOCUMENTS

EP    0 239 433 A1    2/1987

(Continued)

OTHER PUBLICATIONS

PCT International Search Report, PCT/KR2004/000131.

*Primary Examiner*—Michael H Caley
(74) *Attorney, Agent, or Firm*—McKenna Long & Aldridge LLP

(57) ABSTRACT

The present invention relates to a vertically aligned LCD (VA-LCD) comprising a positive compensation film including one or more of a first retardation film (+A-plate) satisfying the condition of $n_x > n_y = n_z$ and a second retardation film (−C-plate) satisfying the condition of $n_x = n_y > n_z$, wherein the first retardation film is arranged such that its optical axis is perpendicular to an optical absorption axis of a neighboring polarizing plate, and a total thickness retardation ($R_{-C} + R_{VA}$) including the thickness retardation of the second retardation film and the thickness retardation of a VA-panel has a positive value in then range of 50-150 nm. The VA-LCD in accordance with the present invention improves contrast characteristics on a front surface and at a tilt angle and minimizes coloring in a black state according to the tilt angle.

17 Claims, 8 Drawing Sheets

U.S. PATENT DOCUMENTS

| | | | | |
|---|---|---|---|---|
| 5,504,603 | A * | 4/1996 | Winker et al. | 349/117 |
| 6,141,075 | A | 10/2000 | Ohmuro et al. | |
| 6,638,582 | B1 | 10/2003 | Uchiyama et al. | |
| 6,642,981 | B1 | 11/2003 | Chida et al. | |
| 6,867,834 | B1 * | 3/2005 | Coates et al. | 349/119 |

FOREIGN PATENT DOCUMENTS

| | | |
|---|---|---|
| EP | 0 793 133 A2 | 9/1997 |
| EP | 1 118 885 A1 | 7/2001 |
| JP | 62-210423 | 9/1987 |
| JP | 10-123576 | 5/1998 |
| JP | 2001-42127 | 2/2001 |
| JP | 3330574 | 7/2002 |
| KR | 1997-0062749 | 9/1997 |
| KR | 1998-25147 | 7/1998 |
| TW | 520449 B | 2/2003 |
| TW | 523620 B | 3/2003 |
| WO | WO 95/00879 | 1/1995 |
| WO | WO 01/09649 A1 | 2/2001 |

* cited by examiner a)

b)

c)

d)

a)  b)

VERTICALLY ALIGNED LIQUID CRYSTAL DISPLAY HAVING POSITIVE COMPENSATION FILM

This application claims priority to Korean Patent Application No. 10-2003-0005466, filed Jan. 28, 2003, which is hereby incorporated by reference.

TECHNICAL FIELD

The present invention relates to a vertically aligned liquid crystal display (hereinafter, referred to as a "VA-LCD") using a compensation film having a positive retardation value so as to improve viewing angle characteristics.

BACKGROUND ART

As well known to those skilled in the art, a −C-plate compensation film and an A-plate compensation film have been used to compensate for a black state of a VA-LCD under the condition that small drive voltage is applied. U.S. Pat. No. 4,889,412 discloses a conventional VA-LCD using the −C-plate compensation film.

However, the conventional VA-LCD using the −C-plate compensation film does not completely compensate for a black state, thus having a disadvantage such as a leakage of light at a viewing angle.

Further, U.S. Pat. No. 6,141,075 discloses a conventional VA-LCD comprising both the −C-plate compensation film and the A-plate compensation film.

The above VA-LCD comprising both the −C-plate compensation film and the A-plate compensation film more completely achieves compensation of a black state under the condition that small drive voltage is applied.

However, the above-described conventional VA-LCDs require improvements of contrast and coloring at a front surface and a tilt angle in order to completely compensate for the black state.

DISCLOSURE OF THE INVENTION

Therefore, the present invention has been made in view of the above problems, and it is an object of the present invention to provide an achromatic VA-LCD comprising a positive compensation film, in which contrast at a front surface and a tilt angle of the VA-LCD filled with liquid crystal having a positive or negative dielectric anisotropy is improved, and coloring at the tilt angle in a black state is minimized, thus improving viewing angle characteristics.

In accordance with the present invention, the above and other objects can be accomplished by the provision of a vertically aligned LCD (VA-LCD) in a multi-domain mode or using a chiral additive, provided with a positive compensation film, in which a vertically aligned panel (VA-panel) is obtained by injecting liquid crystal having a negative dielectric anisotropy ($\Delta\epsilon<0$) or a positive dielectric anisotropy ($\Delta\epsilon>0$) into a gap between upper and lower glass substrates, upper and lower polarizing plates are arranged above the upper and lower surfaces of the VA-panel so that optical absorption axes of the polarizing plates are perpendicular to each other, and a cell gap in the range of 3 μm to 8 μm is maintained, comprising: the positive compensation film including one or more of a first retardation film (+A-plate) satisfying the condition of $n_x>n_y=n_z$, and a second retardation film (−C-plate) satisfying the condition of $n_x=n_y>n_z$, for forming a liquid crystal cell, in which the $n_x$ and $n_y$ represent in-plane refractive indexes between the VA-panel and the upper and lower polarizing plates and the $n_z$ represents a thickness refractive index, wherein the first retardation film is arranged such that an optical axis of the first retardation film is perpendicular to an optical absorption axis of the neighboring polarizing plate, and a total thickness retardation ($R_{-C}+R_{VA}$) including the thickness retardation of the second retardation film and the thickness retardation of the VA-panel has a positive value.

In Example 1 according to the present invention, the positive compensation film may include one of a first retardation film (+A-plate) and one of a second retardation film (−C-plate) in which one of the first retardation film and the second retardation film may be selectively arranged between the VA-panel and the upper polarizing plate, and the other one of the second retardation film is arranged between the VA-panel and the lower polarizing plate, or all of the first retardation film and the second retardation film are arranged at one area between the VA-panel and the upper polarizing plate, or between the VA-panel and the lower polarizing plate.

In Example 2 according to the present invention, the positive compensation film may include two of a first retardation film (+A-plate) and one of a second retardation film (−C-plate), in which one of the first retardation film and one of the second retardation film may be arranged at one area between the VA-panel and the upper polarizing plate, or between the VA-panel and the lower polarizing plate, and the other one of the first retardation film is arranged at the other area between the VA-panel and the upper polarizing plate, or between the VA-panel and the lower polarizing plate.

In Example 3 according to the present invention, the positive compensation film may include two of a first retardation film (+A-plate) and two of a second retardation film (−C-plate), in which one of the first retardation film and one of the second retardation film may be arranged between the VA-panel and the upper polarizing plate, and the other one of the first retardation film and the other one of the second retardation film are arranged between the VA-panel and the lower polarizing plate.

In each of the above examples according to the present invention, a first retardation film (+A-plate) may have a reversed wavelength dispersion in which retardation is increased in proportion to the increase of a wavelength in the range of visible rays, and has a retardation in the range of 20~200 nm, preferably 130~160 nm at a wavelength of 550 nm. The ratio ($R_{A,400}/R_{A,550}$) of the in-plane retardations of the first retardation film (A-plate) is in the range of 0.6 to 0.9; and the ratio ($R_{A,700}/R_{A,500}$) of the in-plane retardations of the first retardation film (A-plate) is in the range of 1.1 to 1.5, wherein the $R_{A,400}$, $R_{A,500}$, $R_{A,550}$ and $R_{A,700}$ represent in-plane retardations at wavelengths of 400 nm, 500 nm, 550 nm and 700 nm, respectively.

Also, in each of the above examples according to the present invention, a second retardation (−C-Plate) film has a retardation in the range of −100~−400 nm at a wavelength of 550 nm, and the total thickness retardation ($R_{-C}+R_{VA}$) including the thickness retardation of a second retardation film and the thickness retardation of the VA-panel may be in the range of 50 nm to 150 nm, being proportional to a wavelength in the range of visible rays, and a relative retardation ($R_{-C,400}/R_{-C,550}$) at wavelengths of 400 nm and 550 nm is larger than that of the VA-panel at the same wavelength and a relative retardation ($R_{-C,700}/R_{-C,550}$) at wavelengths of 550 nm and 700 nm is smaller than that of the VA-panel at the same wavelength. Preferably, the thickness relative retardation ($R_{-C,400}/R_{-C,550}$) at 400 nm and 550 nm of the second retardation film (−C-plate) has in the range of 1.1~1.3, and the thickness relative retardation ($R_{-C,700}/R_{-C,550}$) at 550 nm and 700 nm of the second retardation film (−C-plate) has in the range of 0.8~0.9.

Also, in each of the above examples according to the present invention, directors of liquid crystalline polymers of the VA-panel, under the condition that small voltage is applied to the VA-panel, may have a pretilt angle in the range of 75° to 90° between the upper and lower glass substrates. The pretilt angle is preferably in the range of 87° to 90°, more preferably in the range of 89° to 90°.

Also, in each of the above examples according to the present invention, a liquid crystalline layer formed on the VA-panel may have a retardation at a wavelength of 550 nm, in the range of 80 nm to 400 nm, preferably in the range of 80 nm to 300 nm. A rubbed direction of the liquid crystals injected into the VA-panel may have an angle of 45° with the optical absorption axes of the polarizing plates.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, preferred embodiments of the present invention will be described in detail with reference to the annexed drawings.

Figure 1:
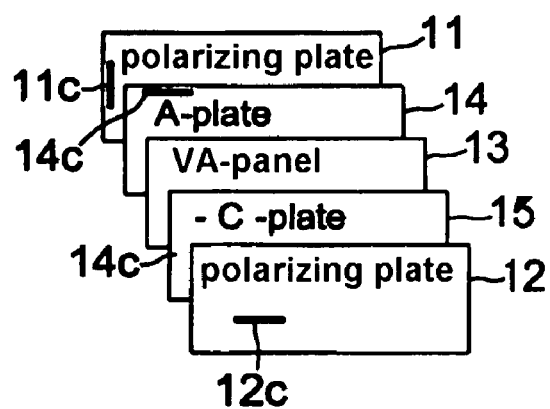
FIGS. 1a to 1d are perspective views of a VA-LCD cell comprising a positive compensation film in accordance with a first embodiment of the present invention.
Figure 1:
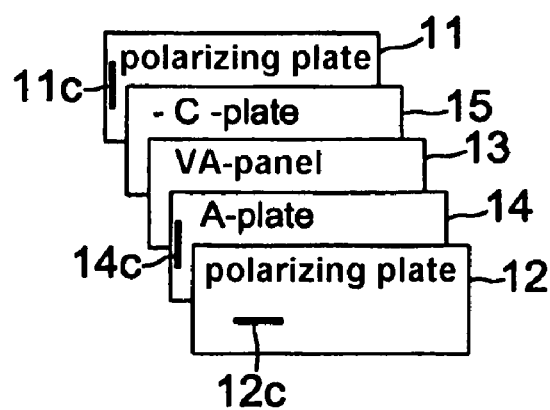
Figure 1:
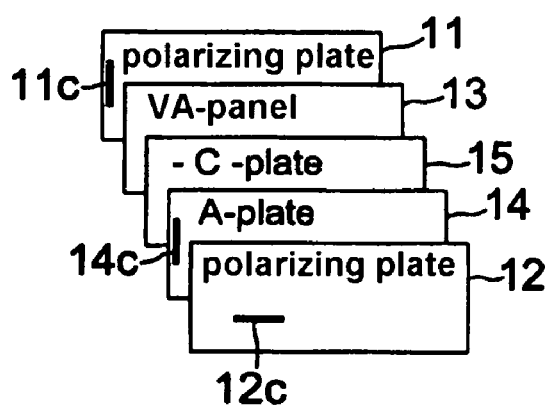
Figure 1:
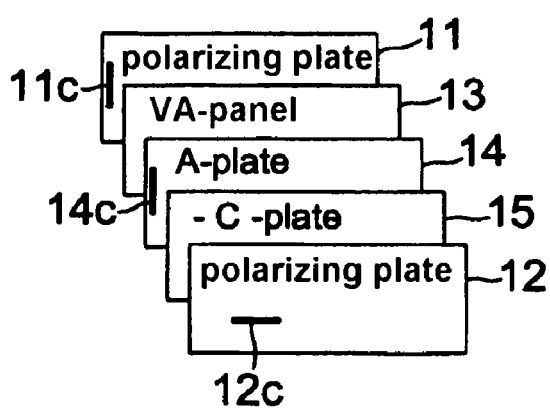
Figure 2:
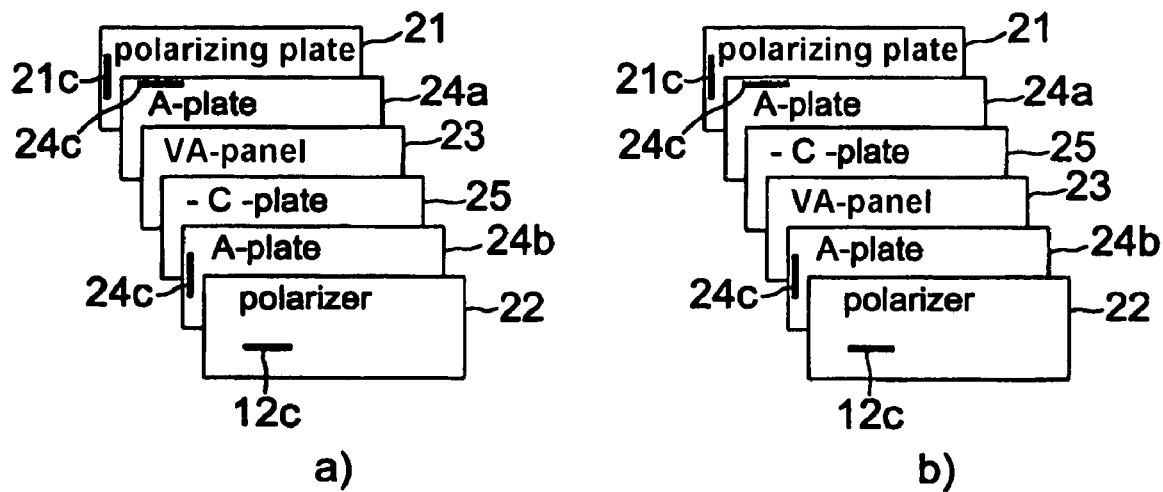
FIGS. 2a and 2b are perspective views of a VA-LCD cell comprising a positive compensation film in accordance with a second embodiment of the present invention.
Figure 3:
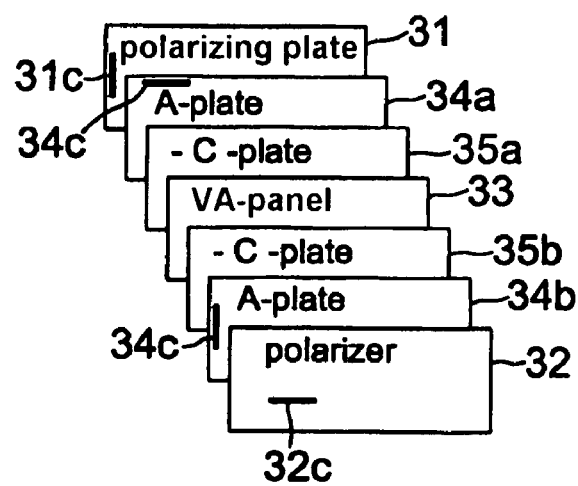
FIG. 3 is a perspective view of a VA-LCD cell comprising a positive compensation film in accordance with a third embodiment of the present invention.

FIGS. 1 to 3 respectively illustrate VA-LCD cells comprising a positive compensation film in accordance with each of examples of the present invention.

FIGS. 1a to 1d are perspective views of a VA-LCD cell comprising a positive compensation film including one of a first retardation film (+A-plate) and one of a second retardation film (−C-plate), in accordance with Example 1 of the present invention. FIGS. 2a and 2b are perspective views of a VA-LCD cell comprising a positive compensation film including two of the first retardation film (+A-plates) and one of the second retardation film (−C-plate), in accordance with Example 2 of the present invention. FIG. 3 is a perspective view of a VA-LCD cell comprising a positive compensation film including two of the first retardation film (+A-plates) and two of the second retardation film (−C-plates), in accordance with Example 3 of the present invention.

EXAMPLE 1

As shown in FIGS. 1a to 1d, a VA-LCD in accordance with Example 1 of the present invention comprises a vertically aligned panel (VA-panel) 13 obtained by injecting liquid crystal having a negative dielectric anisotropy ($\Delta\epsilon<0$) or a positive dielectric anisotropy ($\Delta\epsilon>0$) into a gap between upper and lower glass substrates, two polarizing plates 11 and 12 arranged above the upper and lower surfaces of the VA-panel 13 so that optical absorption axes 11c and 12c are perpendicular to each other, and a positive compensation film including a first retardation film (+A-plate) 14 and a second retardation film (−C-plate) 15, which are arranged between the VA-panel 13 and the polarizing plates 11 and 12.

In FIG. 1a, a first retardation film (+A-plate) 14 is arranged between the VA-panel 13 and the lower polarizing plate 11, and a second retardation film (−C-plate) 15 is arranged between the VA-panel 13 and the upper polarizing plate 12. Here, the first retardation film (+A-plate) 14 is arranged such that an optical axis 14c of the first retardation film (+A-plate) 14 is perpendicular to the optical absorption axis 11c of the lower polarizing plate 11, thus serving as a compensation film for compensating for retardation.

In FIG. 1b, illustrating a modification of Example 1 shown in FIG. 1a, a first retardation film (+A-plate) 14 is arranged between the VA-panel 13 and the upper polarizing plate 12, and a second retardation film (−C-plate) 15 is arranged between the VA-panel 13 and the lower polarizing plate 11. Here, the first retardation film (+A-plate) 14 is arranged such that the optical axis 14c of the first retardation film (+A-plate) 14 is perpendicular to the optical absorption axis 12c of the upper polarizing plate 12.

In FIG. 1c illustrating another modification of Example 1 shown in FIG. 1a, a first retardation film (+A-plate) 14 and a second retardation film (−C-plate) 15 are arranged between the VA-panel 13 and the upper polarizing plate 12. Here, the first retardation film (+A-plate) 14 is arranged such that the optical axis 14c of the first retardation film (+A-plate) 14 is perpendicular to the optical absorption axis 12c of the upper polarizing plate 12.

In FIG. 1d illustrating yet another modification of Example 1 shown in FIG. 1a, a first retardation film (+A-plate) 14 and a second retardation film (−C-plate) 15 are arranged between the VA-panel 13 and the upper polarizing plate 12. However, the positions of the first retardation film (+A-plate) 14 and the second retardation film (−C-plate) 15 are opposite to the positions of the first retardation film (+A-plate) 14 and the second retardation film (−C-plate) 15 in FIG. 1c. Here, the first retardation film (+A-plate) 14 is arranged such that the optical axis 14c of the first retardation film (+A-plate) 14 is perpendicular to the optical absorption axis 12c of the upper polarizing plate 12.

EXAMPLE 2

As shown in FIGS. 2a and 2b, a VA-LCD in accordance with Example 2 of the present invention comprises two polarizing plates 21 and 22 arranged such that optical absorption axes 21c and 22c are perpendicular to each other, a vertically aligned panel (VA-panel) 23 is interposed between the two polarizing plates 21 and 22, and a positive compensation film including two of the first retardation film (+A-plate) 24a and 24b and one of the second retardation film (−C-plate) 25, which are arranged between the VA-panel 23 and the polarizing plates 21 and 22. One of the first retardation films (+A-plates) 24a and 24b and the second retardation film (−C-plate) 25 are arranged at one area between the VA-panel 23 and the upper polarizing plate 22, or between the VA-panel 23 and the lower polarizing plate 21, and the other one of the first retardation film is arranged at the other area between the VA-panel 23 and the upper polarizing plate 22, or between the VA-panel 23 and the lower polarizing plate 21.

In FIG. 2a, a first retardation film (+A-plate) 24a is arranged between the VA-panel 23 and the lower polarizing plate 21, and a first retardation film (+A-plate) 24b and a second retardation film (−C-plate) 25 are arranged between the VA-panel 23 and the upper polarizing plate 22. Here, the first retardation film (+A-plate) 24a is arranged between the VA-panel 23 and the lower polarizing plate 21 such that an optical axis 24c of the first retardation film (+A-plate) 24a is perpendicular to the optical absorption axis 21c of the lower polarizing plate 21, and the first retardation film (+A-plate) 24b is arranged between the VA-panel 23 and the upper polarizing plate 22 such that an optical axis 24c of the first retardation film (+A-plate) 24b is perpendicular to the optical absorption axis 22c of the upper polarizing plate 22.

In FIG. 2b illustrating a modification of Example 2 shown in FIG. 2a, a first retardation film (+A-plate) 24b is arranged between the VA-panel 23 and the upper polarizing plate 22, and a first retardation film (+A-plate) 24a and a second retardation film (−C-plate) 25 are arranged between the VA-panel 23 and the lower polarizing plate 21. Here, the first retardation film (+A-plate) 24b is arranged between the VA-panel 23 and the upper polarizing plate 22 such that the optical axis 24c of the first retardation film (+A-plate) 24b is perpendicular to the optical absorption axis 22c of the upper polarizing plate 22, and the first retardation film (+A-plate) 24b is arranged between the VA-panel 23 and the lower polarizing plate 21 such that the optical axis 24c of the first retardation film (+A-plate) 24a is perpendicular to the optical absorption axis 21c of the lower polarizing plate 21.

EXAMPLE 3

As shown in FIG. 3, a VA-LCD in accordance with Example 3 of the present invention comprises two polarizing plates 31 and 32 arranged such that optical absorption axes 31c and 32c are perpendicular to each other, a vertically aligned panel (VA-panel) 33 is interposed between the two polarizing plates 31 and 32, and a positive compensation film including two of a first retardation film (+A-plates) 34a and 34b and two of a second retardation film (−C-plates) 35a and 35b, which are arranged between the VA-panel 33 and the polarizing plates 31 and 32. One of the first retardation films (+A-plates) 34a and 34b and one of the second retardation films (−C-plates) 35a and 35b are arranged at one area between the VA-panel 33 and the upper polarizing plate 32 and between the VA-panel 33 and the lower polarizing plate 31, and the other one of the first retardation films (+A-plates) 34a and 34b and the other one of the second retardation films (−C-plates) 35a and 35b are arranged at the other area between the VA-panel 33 and the upper polarizing plate 32 and between the VA-panel 33 and the lower polarizing plate 31.

In FIG. 3, a first retardation film (+A-plate) 34a and a second retardation film (−C-plate) 35a are arranged between the VA-panel 33 and the lower polarizing plate 31, and a first retardation film (+A-plate) 34b and a second retardation film (−C-plate) 35b are arranged between the VA-panel 33 and the upper polarizing plate 32. Here, the first retardation film (+A-plate) 34a is arranged between the VA-panel 33 and the lower polarizing plate 31 such that an optical axis 34c of the first retardation film (+A-plate) 34a is perpendicular to the optical absorption axis 31c of the lower polarizing plate 31, and the first retardation film (+A-plate) 34b is arranged between the VA-panel 33 and the upper polarizing plate 32 such that an optical axis 34c of the first retardation film (+A-plate) 34b is perpendicular to the optical absorption axis 32c of the upper polarizing plate 32.

The above-described VA-LCD in accordance with each of Example 1 to 3 of the present invention is a multi-domain vertically aligned LCD (MVA-LCD) or a VA-LCD using a chiral additive, which maintains a cell gap in the range of 3 μm to 8 μm and is obtained by forming the VA-panel by injecting liquid crystal having a negative dielectric anisotropy ($\Delta \in <0$) or a positive dielectric anisotropy ($\Delta \in >0$) into a gap between upper and lower glass substrates and arranging two polarizing plates above the upper and lower surfaces of the VA-panel so that optical absorption axes of the polarizing plates are perpendicular to each other. Here, since the positive compensation film including at least one of a first retardation film (+A-plate) and at least one of a second retardation film (−C-plate) is arranged between the VA-panel and the upper and lower polarizing plates, the VA-LCD has a characteristic such that a total thickness retardation ($R_{-C}+R_{VA}$) including a retardation of the second retardation film (−C-plate) and a retardation of the VA-panel has a positive value.

A first retardation film (+A-plate), used as the compensation film of the respective embodiments of the present invention, has $n_x>n_y=n_z$ wherein $n_x$ and $n_y$ are a in-plane refractive index and $n_z$ is a thickness refractive index, and have a reversed wavelength dispersion in which retardation is increased in proportion to the increase of a wavelength in the range of visible rays, so that an optical axis of the first retardation film (+A-plate) is perpendicular to the optical absorption axis of the adjacent polarizing plate. Particularly, the first retardation film has a retardation in the range of 20~200 nm, preferably 130 nm~160 nm at a wavelength of 550 nm. The ratio ($R_{A,400}/R_{A,550}$) of relative retardations at wavelengths of 400 nm and 550 nm of the first retardation film (A-plate) is in the range of 0.6~0.9, and the ratio ($R_{A,700}/R_{A,500}$) of relative retardations at wavelengths of 700 nm and 500 nm thereof is in the range of 1.1~1.5.

A second retardation film (−C-plate), used as the compensation film of the respective embodiments of the present invention, has $n_x=n_y>n_z$, and a retardation in the range of −100~−400 nm at a wavelength of 550 nm. The total thickness retardation ($R_{-C}+R_{VA}$), including the retardation of a second retardation film (−C-plate) and the retardation of the VA-panel, has a value preferably in the range of 50~150 nm in the range of visible rays. In particular, a relative retardation $(R_{-C,400}/R_{-C,550})$ at 400 nm and 550 nm of the second retardation film is larger than that of the VA-panel at the same wavelength, and a relative retardation $(R_{-C,700}/R_{-C,550})$ at 700 nm and 550 nm of the second retardation film is smaller than that of the VA-panel at the same wavelength. Preferably, a thickness relative retardation $(R_{-C,400}/R_{-C,550})$ at 400 nm and 550 nm of the second retardation film (−C-plate) is in the range of 1.1~1.3, and a thickness relative retardation $(R_{-C,700}/R_{-C,550})$ at 700 nm and 550 nm thereof is in the range of 0.8~0.9.

Under the condition that no voltage is applied to the VA-panel in accordance with each of examples of the present invention, directors of liquid crystalline polymers of the VA-panel have a pretilt angle in the range of 75o to 90° between the upper and lower substrates, preferably in the range of 87o to 90°, and more preferably in the range of 89° to 90°.

Further, a liquid crystalline layer formed on the VA-panel in accordance with each of the embodiments of the present invention has a retardation in the range of 80l nm to 400 nm at a wavelength of 550 nm, and preferably in the range of 80 nm to 300 nm. A rubbed direction of liquid crystals injected into the VA-panel has an angle of 45° with the optical absorption axis of the polarizing plate.

The polarizing plate applied to each of examples of the present invention includes a TAC (Triacetate Cellulose) protective film having designated thickness retardation, or one of other protective films having no designated thickness retardation.

Effects of the VA-LCD by examples of the present invention are described in the following taken in conjunction with the accompanying drawings.

Figure 4:
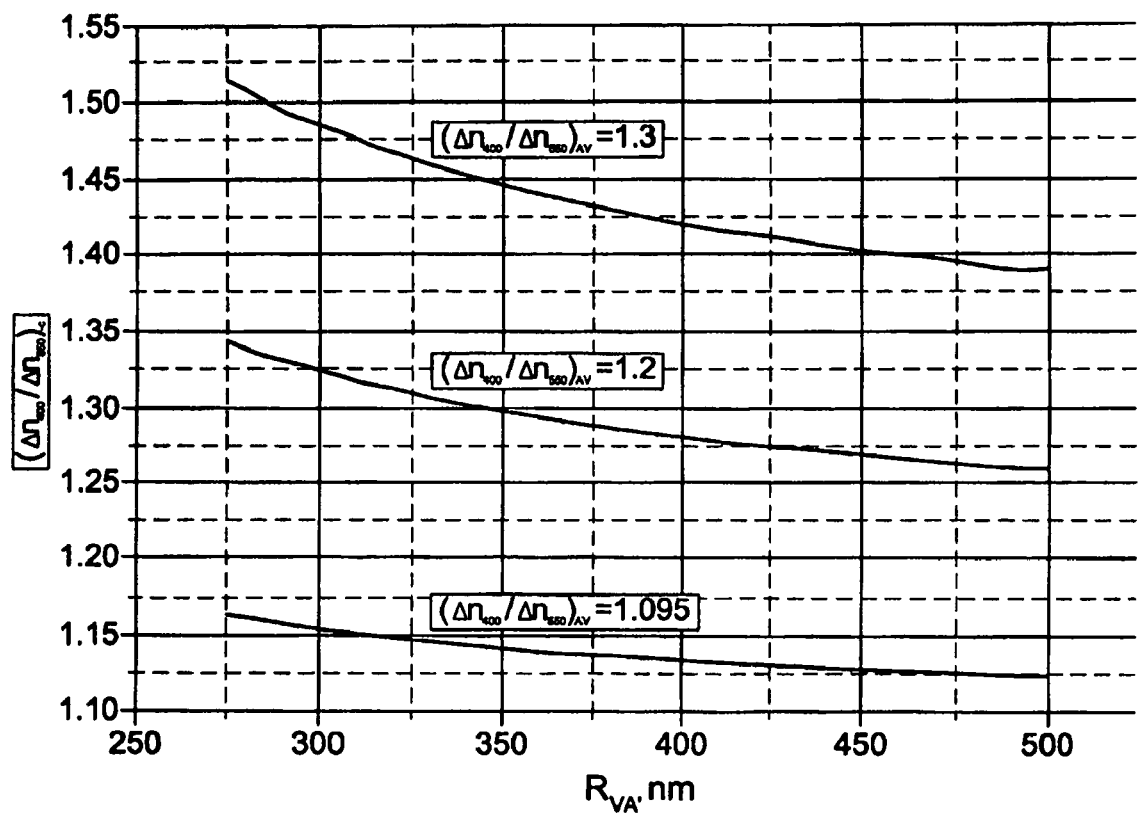
FIG. 4 is a graph showing a thickness retardation ($R_{VA,550}$) of a VA-LCD at 550 nm in relation to the ratio ($R_{-C,400}/R_{-C,550}$) of a thickness retardation of a second film at 400 nm and a thickness retardation of a second film at 550 nm.
Figure 5:
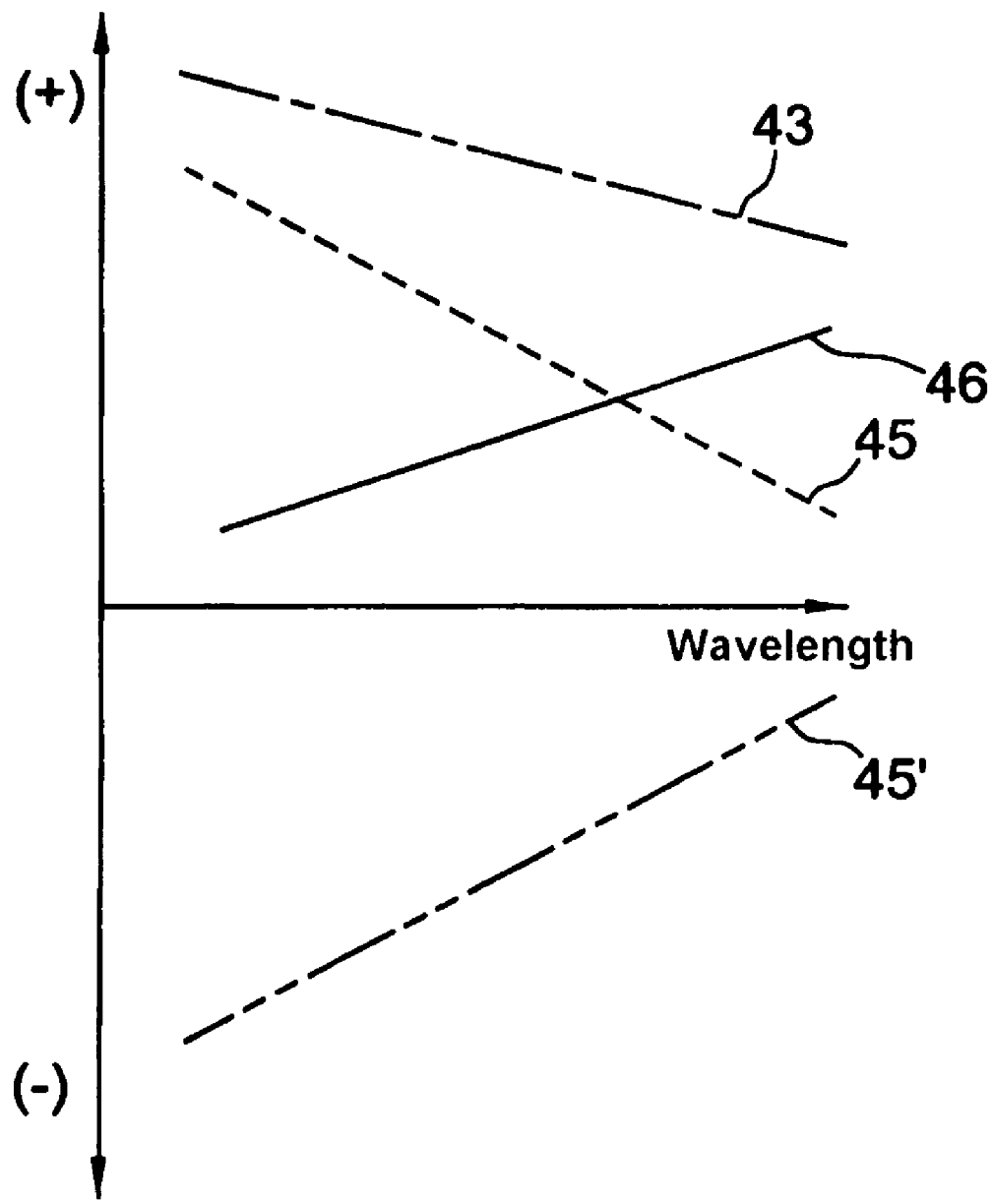
FIG. 5 is a graph showing the results of simulation for wavelength dependability of a thickness retardation of the VA-LCD cell, a thickness retardation of a second retardation film (C-plate), its absolute value, and a total thickness retardation in the VA-LCD cell comprising the positive compensation film of the present invention.

FIG. 4 is a graph showing a thickness retardation $(R_{VA,550})$ of a VA-LCD at 550 nm in relation to the ratio $(R_{-C,400}/R_{-C,550})$ of a thickness retardation of a second film at 400 nm and a thickness retardation of a second film at 550 nm; and FIG. 5 is a graph showing the results of simulation for wavelength dependability of a thickness retardation $(R_{VA}>0)$ 43 of the VA-panel, a thickness retardation $(R_{-C}<0)$ 45' of a second retardation film (−C-plate), its absolute value 45, a total thickness retardation $(R_{VA}+R_{-C}>0)$ 46. Here, there is applied an achromatic positive compensation film in which the total thickness retardation $(R_{VA}+R_{-C}>0)$ of the retardations of the VA-panel and a second retardation film (−C-plate) has a positive value.

The thickness retardation $(R_{-C, 550})$ of a second retardation film (−C-plate), which is required to compensate for the VA-LCD, is obtained by the following equation.

$$R_{VA, 550}+R_{-C, 550}=100 \text{ nm-}130 \text{ nm (mean value: }115 \text{ nm)}$$

$$R_{VA, 550}=(d\times\Delta n_{550})_{VA}$$

Here, $R_{VA, 550}$ represents a thickness retardation of the VA-panel at a wavelength of 550 nm, and $R_{-C, 550}$ represents a thickness retardation of the second retardation film (−C-plate) at a wavelength of 550 nm.

A wavelength dispersion $(\Delta n_\lambda/\Delta n_{550})_{-C}$ required by the second retardation film (−C-plate) is calculated by the following equation.

$$(\Delta n_{A\lambda}/\Delta n_{550})_{VA}\times R_{VA,550}+(\Delta n_\lambda/\Delta n_{550})_{-C}\times R_{-C,550}=115 \text{ nm}$$

Here, $(\Delta n_\lambda/\Delta n_{550})_{VA}$ represents a wavelength dispersion of the thickness retardation of the VA-LCD, and $(\Delta n_\lambda/\Delta n_{550})_{-C}$ represents a wavelength dispersion of the thickness retardation of a second retardation film (−C-plate).

In particular, for any wavelength ($\lambda$=400 nm), $$(\Delta n_{400}/\Delta n_{550})_{VA}\times R_{VA,550}+(\Delta n_{400}/\Delta n_{550})_{-C}\times R_{-C,550}=115 \text{ nm}$$

The calculated results for a relative value of a thickness retardation $(R_{-C,400}/R_{-C,550}=(\Delta n_\lambda/\Delta n_{550})_{VA})$ of a second retardation film (−C-plate) for $R_{VA,550}$ are shown in FIG. 4.

The optimum condition for a in-plane retardation $R_\lambda$=0.25×$\lambda$ of a first retardation film (A-plate) is an achromatic quarter wave ($\lambda$/4) film.

Accordingly, a relative retardation is $$R_{400}/R_{500}=400/500=0.727, R_{700}/R_{550}=700/500=1.273$$

Figure 6:
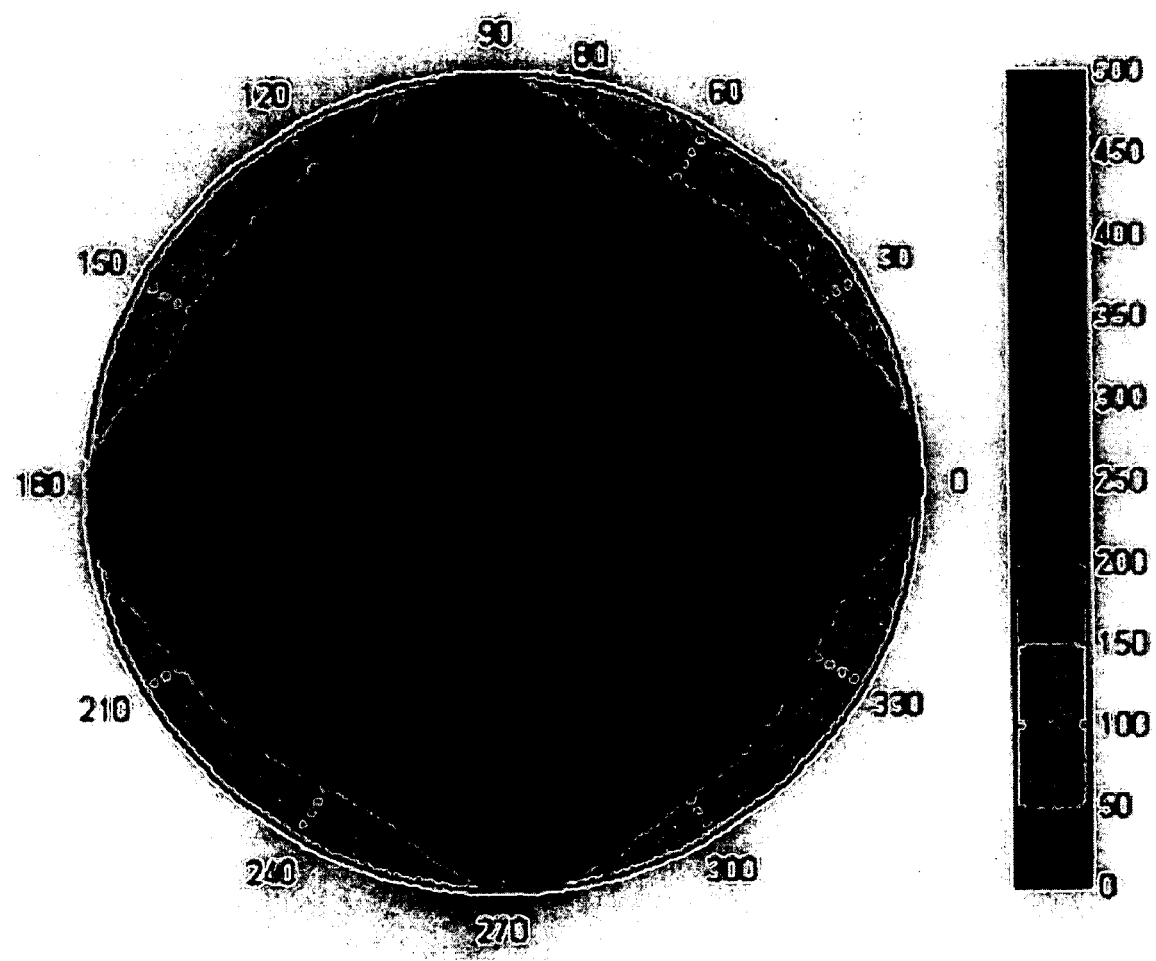
FIG. 6 is a diagram showing the result of simulation for a contrast ratio of the VA-LCD cell comprising a positive compensation film in accordance with Example 1 of the present invention at a tilt angle in the range of 0° to 80° at all azimuth angles, in case that a white ray is applied.
Figure 7:
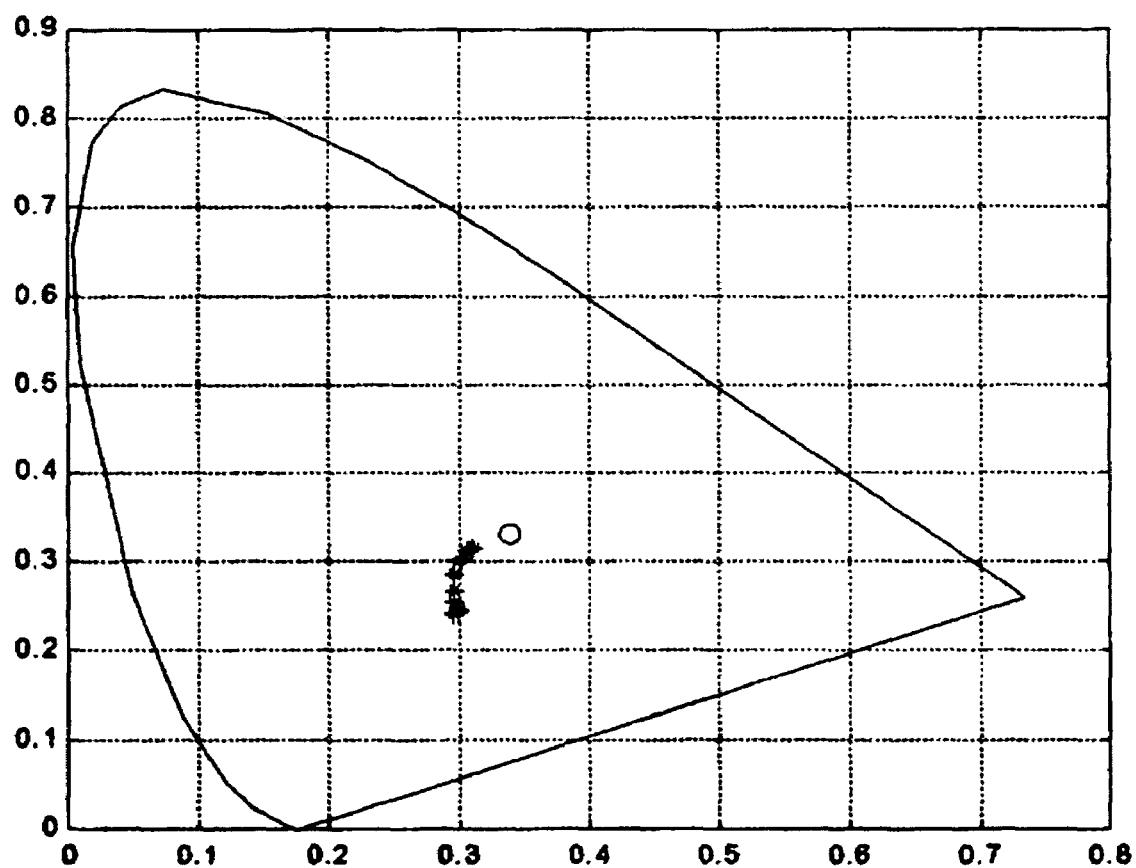
FIG. 7 is a diagram showing the result of simulation for coloring of the VA-LCD cell comprising a positive compensation film in accordance with Example 1 of the present invention in a black state at a tilt angle in the range of 0° to 80°, which is varied by an interval of 2°, at an azimuth angle of 45°, in case that a white ray is applied.
Figure 8:
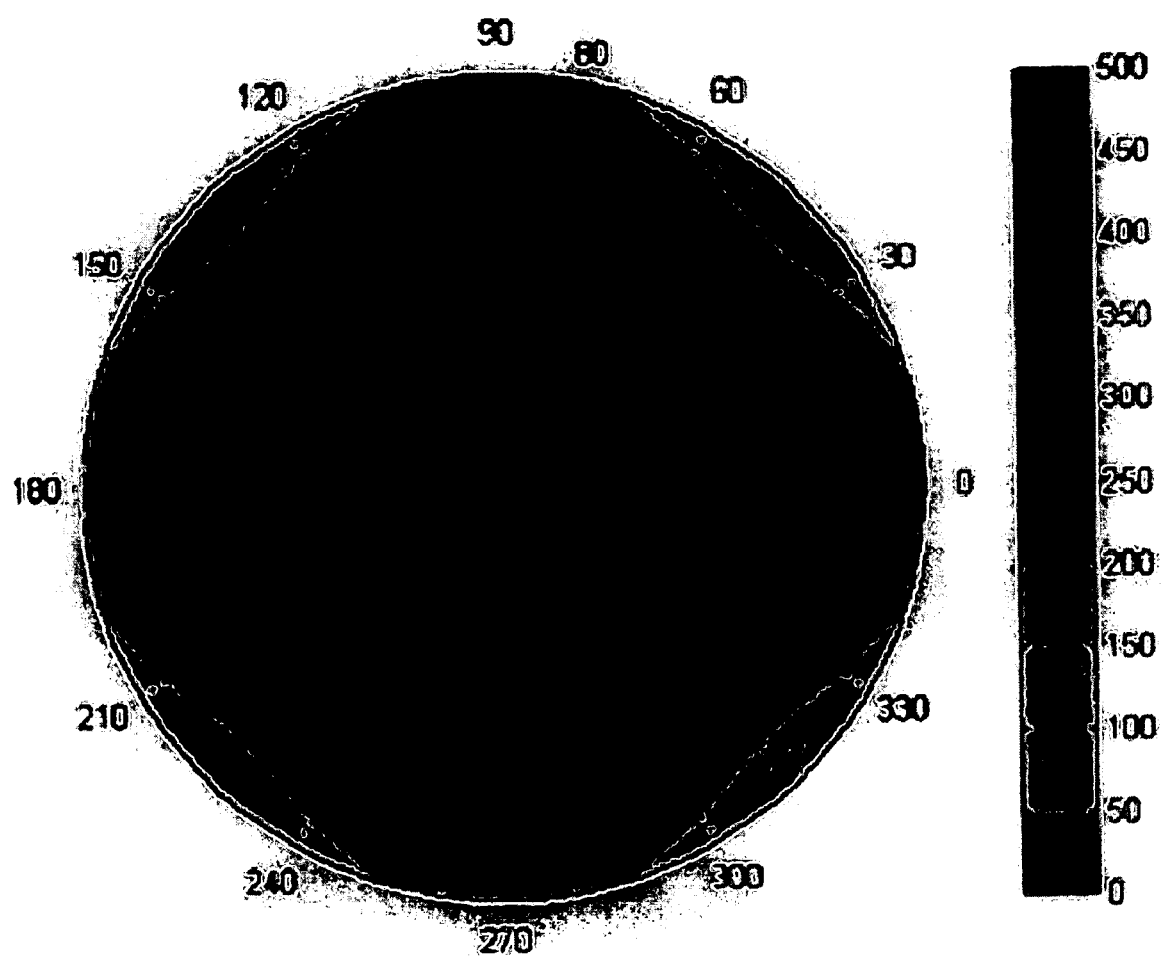
FIG. 8 is a diagram showing the results of simulation for a contrast ratio of the VA-LCD cell comprising a positive compensation film in accordance with Example 2 of the present invention at a tilt angle in the range of 0° to 80° at all azimuth angles, in case that a white ray is applied.
Figure 9:
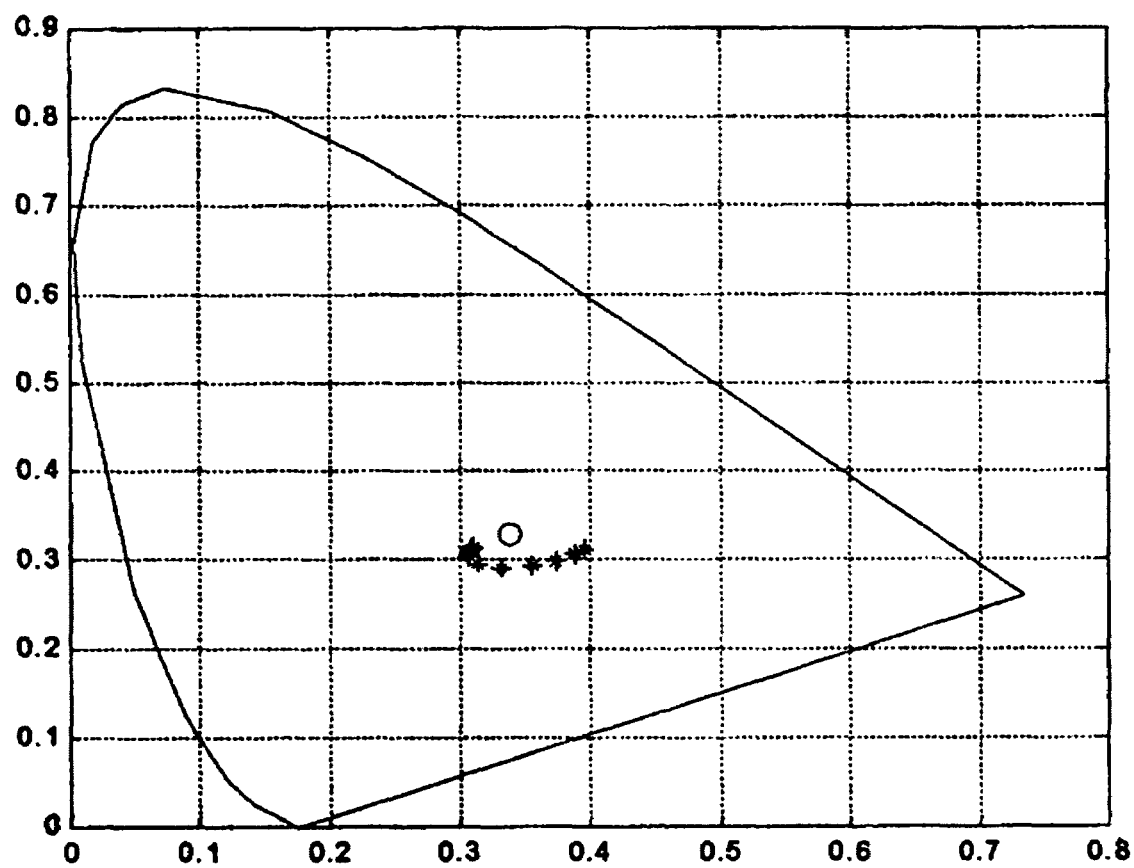
FIG. 9 is a diagram showing the results of simulation for coloring of the VA-LCD cells in accordance with examples 1 and 2 of the present invention in a black state at a tilt angle in the range of 0° to 80°, which is varied by an interval of 2°, at an azimuth angle of 45°, in case that a white ray is applied.

FIGS. 6 to 9 show the results of simulation obtained in respective examples of the present invention. FIGS. 6 and 8 show the results of simulation for a contrast ratio, using a color coordinate, obtained by the VA-LCD of the respective examples of the present invention at a tilt angle in the range of 0° to 80° at all azimuth angles, in case that a white ray is applied. FIGS. 7 and 9 show the results of simulation for coloring in a black state, using a color coordinate, obtained by the VA-LCD of the respective examples of the present invention at a tilt angle in the range of 0° to 80°, which is varied by an interval of 2°, at an azimuth angle of 45°, in case that a white ray is applied.

Hereinafter, experimental examples for testing contrast characteristics of samples selected from the above examples of the present invention will be described. Improvements of the contrast characteristics in the respective examples will be more easily understood by the below experimental examples. The below experimental examples will be disclosed for illustrative purposes, but do not limit the subject matter of the present invention.

EXPERIMENTAL EXAMPLE 1

A sample employed by Experimental Example 1 was the VA-LCD of FIG. 1(a) prepared by Example 1. The sample include VA-panel having a cell gap of 3 μm, wherein a pretilt angle of directors of liquid crystalline polymers is 89°, a dielectric anisotropy ($\Delta\in$) is −4.9, a refractive anisotropy ($\Delta$n) is 0.0979, and a wavelength dispersion ($\Delta n_{400}/\Delta n_{550}$) is 1.0979. Accordingly, a thickness retardation $(R_{VA,550})$ of the VA-panel at a wavelength of 550 nm is 297 nm.

And the above second retardation film (−C-plate) employed one of the compensation films is made of liquid crystal film, having a retardation $(R_{A,550})$ of 145 nm at a in-plane and a wavelength dispersion $(R_{A,400}/R_{A,550})$ of 0.72.

Table 1 comparatively shows contrasts of the sample (hereinafter, referred to as a "first sample") employed by Experimental Example 1 and a sample (hereinafter, referred to as a "second sample") serving as a comparative example. Here, in the first sample, the retardation $(R_{VA})$ of the VA-panel, the retardation $(R_{-C})$ of a second retardation film, the total retardation $(R_{TOTAL})$ and the retardation $(R_A)$ were 297, −47, +250 and 0, respectively. On the other hand, in the second sample, the retardation $(R_{VA})$ of the VA-panel, the retardation $(R_{-C})$ of the second retardation film, the total retardation $(R_{TOTAL})$ and the retardation $(R_A)$ were 297, −500, +203 and 460, respectively. The minimum contrasts of the first and second samples at a tilt angle of 70o were 120 and 5, respectively.

TABLE 1

| | $R_{VA}$ | $R_{-C}$ | $R_{TOTAL}$ | $R_A$ | Minimum contrast (at a tilt angle of 70°) |
|---|---|---|---|---|---|
| First sample (Experimental Example) | 297 | −190 | +107 | 145 | 120 |
| Second sample (Comparative Example) | 297 | −47 | +250 | 0 | 5 |

In Table 1, the minimum contrasts of the first and second samples at a tilt angle of 70° were 120 and 5. Since the tilt angle of 70° has the minimum contrast, other tilt angles rather than the tilt angle of 70° have contrasts higher than the minimum contrast. Accordingly, the contrasts at other tilt angles rather than the tilt angle of 70° are higher than the minimum contrast.

EXPERIMENTAL EXAMPLE 2

A sample employed by Example 2 was a VA-LCD of FIG. 1(d) which is one of the modified examples of Example 1.

The VA-LCD of FIG. 1(d) has a cell gap of 4 μm, a pretilt angle of 89°, a dielectric anisotropy (Δ∈) of −4.9, a refractive anisotropy (Δn) of 0.0979, and a wavelength dispersion ($\Delta n_{400}/\Delta n_{550}$) of 1.0979. Accordingly, the thickness retardation ($R_{VA,550}$) of the VA-panel at a wavelength of 550 nm is 396 nm.

And a second retardation film (−C-plate), which is employed as one of compensation films, is made of liquid crystal. The second retardation film has a thickness retardation ($R_{-C,550}$) of −279 nm and a wavelength dispersion ($R_{-C,400}/R_{-C,550}$) of 1.21.

A first retardation film (A-plate), which is employed as another of compensation films, is made of hardened nematic liquid crystal. The first retardation film has a retardation ($R_{A,550}$) of 147 nm at a in-plane and a wavelength dispersion ($R_{A,400}/R_{A,550}$) of 0.72.

As for a liquid crystal cell of Experimental Examples 1 and 2, FIG. 6 shows the result of simulation for contrast ratio of the above VA-LCD at a tilt angle in the range of 0° to 80° at all azimuth angles, and FIG. 7 shows the result of simulation for coloring of the above VA-LCD in a black state at a tilt angle in the range of 0° to 80° at an azimuth angle of 45°

EXPERIMENTAL EXAMPLE 3

A sample employed by Example 3 was a VA-LCD of FIG. 2(a).

The sample includes a VA-panel having a cell gap of 3 μm, a pretilt angle of 89°, a dielectric anisotropy (Δ∈) of −4.9, a refractive anisotropy (Δn) of 0.0979, and a wavelength dispersion ($\Delta n_{400}/\Delta n_{550}$) of 1.0979. Accordingly, the thickness retardation ($R_{VA,550}$) of the VA-panel at a wavelength of 550 nm is 297 nm.

And a second retardation film (−C-plate), which is employed as one of compensation films, is made of liquid crystal. The second retardation film has a thickness retardation ($R_{-C,550}$) of −130 nm and a wavelength dispersion ($R_{-C,400}/R_{-C,550}$) of 1.31.

A first retardation film (A-plate), which is employed as another of compensation films, is made of hardened nematic liquid crystal. The first retardation film has a retardation ($R_{A,550}$) of 90 nm at a in-plane and a wavelength dispersion ($R_{A,400}/R_{A,550}$) of 0.72.

EXPERIMENTAL EXAMPLE 4

A sample employed by Example 4 was a VA-LCD of FIG. 3, which is Example 3. The sample has a cell gap of 3 μm, a pretilt angle of 89°, a dielectric anisotropy (Le) of −4.9, a refractive anisotropy (Δn) of 0.0979, and a wavelength dispersion ($\Delta n_{400}/\Delta n_{550}$) of 1.0979. Accordingly, the thickness retardation ($R_{VA,550}$) of the VA-panel at a wavelength of 550 nm is 297 nm.

And a second retardation film (−C-plate), which is employed as one of compensation films, is made of liquid crystal. The second retardation film has a thickness retardation ($R_{-C,550}$) of −65 nm and a wavelength dispersion ($R_{-C,400}/R_{-C,550}$) of 1.31.

Two of a first retardation film (A-plate), which is employed as another of compensation films, is made of hardened liquid crystal. The first retardation film has a retardation ($R_{A,550}$) of 90 nm at a in-plane and a wavelength dispersion ($R_{A,400}/R_{A,550}$) of 0.72.

As for a liquid crystal cell of Experimental Example 3 and 4, FIG. 8 shows the result of simulation for contrast ratio of the above VA-LCD at a tilt angle in the range of 0° to 80° at all azimuth angles, and FIG. 9 shows the result of simulation for coloring of the above VA-LCD in a black state at a tilt angle in the range of 0° to 80° at an azimuth angle of 45°.

INDUSTRIAL APPLICABILITY

As apparent from the above description, the present invention provides a VA-LCD comprising a positive compensation film including at least one of a first retardation film (A-plate) and at least one of a second retardation film (−C-plate), which compensates for a dark state at a tilt angle of the VA-LCD and minimizes coloring in dark, white and RGB states, thus improving viewing angle characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vertically aligned LCD (VA-LCD) in a multi-domain mode or using a chiral additive, provided with a positive compensation film, in which a vertically aligned panel (VA-panel) is obtained by injecting liquid crystal having a negative dielectric anisotropy (Δ∈<0) or a positive dielectric anisotropy (Δ∈>0) into a gap between upper and lower glass substrates, upper and lower polarizing plates are arranged above the upper and lower surfaces of the VA-panel so that optical absorption axes of the polarizing plates are perpendicular to each other, and a cell gap in the range of 3 μm to 8 μm is maintained, comprising:

the positive compensation film including one or more of a first retardation film (+A-plate) satisfying the condition of $n_x > n_y = n_z$, and including a second retardation film (−C-plate) satisfying the condition of $n_x = n_y > n_z$, for forming a liquid crystal cell, wherein said $n_x$ and $n_y$ represent in-plane refractive indexes between the VA-panel and the upper and lower polarizing plates, and said $n_z$ represents a thickness refractive index, wherein said first retardation film is arranged such that an optical axis of said first retardation film is perpendicular to an optical absorption axis of the neighboring polarizing plate, and a total thickness retardation ($R_{-C} + R_{VA}$)

including the thickness retardation of said second retardation film and the thickness retardation of the VA-panel has a positive value.

2. The VA-LCD according to claim 1, wherein
said positive compensation film includes one of said first retardation film (+A-plate) and one of said second retardation film (−C-plate) in which
one of said first retardation film and said second retardation film is selectively arranged between the VA-panel and the upper polarizing plate, and the other one of said second retardation film is arranged between the VA-panel and the lower polarizing plate, or
said first retardation film and said second retardation film are arranged at one area between the VA-panel and the upper polarizing plate, or between the VA-panel and the lower polarizing plate.

3. The VA-LCD according to claim 1, wherein
said positive compensation film includes two of said first retardation film (+A-plate) and one of said second retardation film (−C-plate) in which
one of said first retardation film and one of said second retardation film are arranged at one area between the VA-panel and the upper polarizing plate, or between the VA-panel and the lower polarizing plate, and the other one of said first retardation films is arranged at the other area between the VA-panel and the upper polarizing plate, or between the VA-panel and the lower polarizing plate.

4. The VA-LCD according to claim 1, wherein
said positive compensation film includes two of said first retardation film (+A-plate) and two of said second retardation film (−C-plate) in which
one of said first retardation film and one of said second retardation film are arranged between the VA-panel and the upper polarizing plate, and the other one of said first retardation film and the other one of said second retardation film are arranged between the VA-panel and the lower polarizing plate.

5. The VA-LCD according to claim 1, wherein
said first retardation film (+A-plate) has a reversed wavelength dispersion in which retardation is increased in proportion to the increase of a wavelength in the range of visible rays; and
the total thickness retardation ($R_{-C}+R_{VA}$) including the thickness retardation of said second retardation film and the thickness retardation of the VA-panel is in the range of 50 nm to 150 nm, being proportional to a wavelength in the range of visible rays.

6. The VA-LCD according to claim 5, wherein a liquid crystalline layer formed on said VA-panel has a retardation in the range of 80 nm to 400 nm at a wavelength of 550 nm.

7. The VA-LCD according to claim 6, wherein a liquid crystalline layer formed on said VA-panel has a retardation in the range of 80 nm to 300 nm at a wavelength of 550 nm.

8. The VA-LCD according to claim 5, wherein a rubbed direction of the liquid crystals injected into said VA-panel has an angle of 45° with the optical absorption axes of said polarizing plates.

9. The VA-LCD according to claim 5, wherein said first retardation film (A-plate) has a retardation in the range of 20~200 nm at a wavelength of 550 nm.

10. The VA-LCD according to claim 9, wherein said first retardation film (A-plate) preferably has a retardation in the range of 130~160 nm at a wavelength of 550 nm.

11. The VA-LCD according to claim 5, wherein the ratio ($R_{A,400}/R_{A,550}$) of a retardation of said first retardation (A-plate) is in the range of 0.6~0.9, and the ratio ($R_{A,700}/R_{A,550}$) of a relative retardation is in the range of 1.1~1.5.

12. The VA-LCD according to claim 5, wherein said second retardation film has a thickness retardation in the range of −100~−400 nm at a wavelength of 550 nm.

13. The VA-LCD according to claim 5, wherein a relative retardation ($R_{-C,400}/R_{-C,550}$) at 400 nm and 550 nm of said second retardation film (−C-plate) is larger than that of said VA-panel, and a relative retardation ($R_{-C,700}/R_{-C,550}$) at 700 nm and 550 nm of said second retardation film (−C-plate) is smaller than that of said VA-panel.

14. The VA-LCD according to claim 13, wherein a thickness relative retardation ($R_{-C,400}/R_{-C,550}$) at 400 nm and 550 nm of said second retardation film (−C-plate) is in the range of 1.1~1.3, and a thickness relative retardation ($R_{-C,700}/R_{-C,550}$) at 700 nm and 550 nm thereof is in the range of 0.8~0.9.

15. The VA-LCD according to 5, wherein directors of liquid crystalline polymers of the VA-panel, under the condition that small voltage is applied to the VA-panel, have a pretilt angle in the range of 75° to 90° between the upper and lower glass substrates.

16. The VA-LCD according to claim 15, wherein said pretilt angle is in the range of 87° to 90°.

17. The VA-LCD according to claim 15, wherein said pretilt angle is in the range of 89° to 90°.

* * * * *